United States Patent Office

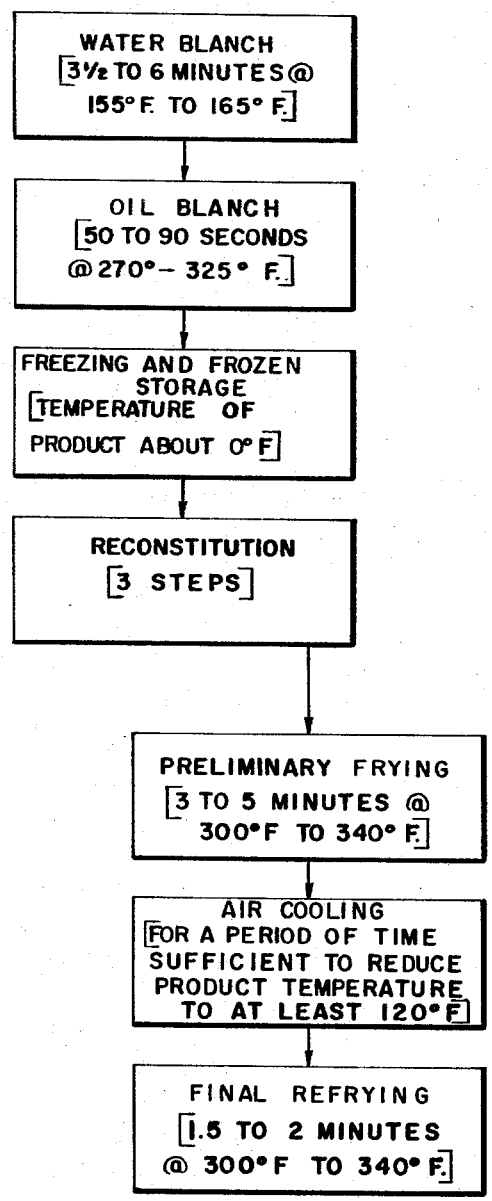

3,355,299
Patented Nov. 28, 1967

3,355,299
METHOD OF PREPARING DEEP FAT FRIED
FRENCH AND STRING POTATOES
Richard L. McLaughlin, American Falls, and Earl E. Anderson, Pocatello, Idaho, assignors to Lamb-Weston, Inc., Portland, Oreg., a corporation of Oregon
Filed Aug. 24, 1964, Ser. No. 391,432
6 Claims. (Cl. 99—100)

This invention relates to a novel method directed not only to the preliminary and essential steps to be taken prior to the freezing of a French fried potato product, but contemplates also, as a part of the process, certain operations to be performed when such frozen product is reconstituted prior to consumption.

In more particular, the process of the invention, with respect to both certain preliminary blanching steps as well as to the final and two phase frying steps, may be termed a four stage system.

As pointed out in Talburt and Smith "Potato Processing" (1959), commonly known methods of frying involve the use of one fryer or two fryers in series; the respective methods are typified as comprising single-stage and two-stage systems. Hence the designation of this process, insofar as its reference to blanching and frying be concerned, as a "four stage system," for there is here provided the combination of an initial water blanch, an immediately following oil blanch, and these two steps, in the preparation of the product for consumption are in turn followed by two separate final, frying stages.

There has been a long concerted effort in the past to obtain, from the frozen vegetable, a French fried potato product which will meet all the qualifications for high grade ratings that are set and defined by the industry. In other words, the requisites of a proper product, and hence one which will be more readily acceptable by the consumer, include such quality standards as the following, all of which are referred to in the text cited above. The reconstituted fried product should not exhibit sogginess or mushiness but have the proper internal texture (mealiness); it must not be excessively greasy nor be too dark in color, nor have a scorched appearance. In other words flavor, surface color, fat absorption, form and symmetry, external and internal texture, etc., have been typified by Talburt and Smith (supra) as representing the yardsticks by which to measure or control the quality of a proper and highly acceptable French fried, frozen, and "reconstituted" product.

It should be understood that these "yardsticks" are to be used for the measurement or evaluation of the normal, and known, French fried product. Actually, the process of the present invention has as its primary purpose the production of a superior product: one that is crisper, thinner, drier, and so far as human evaluation can determine, tastier. It is possible that the greater dryness results from the fact that more moisture is boiled from the product during the course of the involved treatment. It is also theorized that the product is tastier because of a slightly higher oil content, as contrasted with the normal, known, ready-to-eat product. Another distinction, particularly with respect to the known type of shoe string potato, is that the product resultant upon practice of the instant invention exhibits an altered, and more desirable surface texture. In many instances the improved product of our invention evidences perceptible "blisters" on the surface. Such "blisters" are somewhat comparable to the blisters found in a potato chip product. It is our view that the source of this uniqueness, in the respect stated, is the result of the final frying, cooling, and refrying stages. Although these three subsequent phases of the procedure may have heretofore been known with respect to the preparation of a French fried product, from the fresh potato, until the advent of the instant procedure, such result had never before been obtained from the frozen product. Hence the invention contemplates primarily the treatment of a frozen potato in such manner that the superior and unique product of the foregoing description is obtainable.

By "reconstitution" is here included this additional meaning—the production of an optimum product which has undergone frozen storage for a considerable period of time without damage, and hence, upon final preparation for consumption, does not exhibit those factors bespeaking deterioration, as outlined in the foregoing.

Aside from this definition of the term, which is made with reference to the final cooking after freezing, we here propose a method of preparing frozen French fries (in particular) that are far superior, with respect to the enumerated qualities, to any French fried product heretofore attained. In other words, the product of the instant invention is superior to the normal type of fried product, whether prepared from the frozen or fresh potato.

Concentrated experimentation, leading to a proven exceptionally high quality product, has demonstrated that the necessary and enumerated attributes of this invention (i.e., a far superior product to that now on the market) cannot be obtained unless a certain sequence of steps, within rather carefully controlled limits as to time and temperature conditions, etc., is followed with exactitude. Substantial deviation in either direction results in a final, reconstituted product which does exhibit certain undesirable characteristics, such as absence of proper external and internal texture, excessive oil absorption, lack of proper surface color, etc.

It has also been found, with respect to certain preliminary steps having to do with pre-freezing preparation, that these are of particular significance—two initial steps of the process comprise water and oil blanching within controlled limitations. It has been demonstrated that, unless both of such preliminary treatments be conducted within confined boundaries, the resulting, reconstituted product is not of proper quality, nor acceptable under the qualifications or standards mentioned above. The purpose of the referred to dual water blanch-oil blanch procedure is to properly achieve comparatively complete inactivation of the involved enzymes, while at the same time precluding a later "sloughing effect." Although it has been appreciated that while a potato strip can be only water blanched to at least partially inactivate such enzymes, we have found that in such cases the outer texture of such strip (without subsequent oil blanching) will dehydrate and slough off after freezing. The end product, after reconstitution, is then unsatisfactory. In contrast, and in accordance with our procedure, if such water blanch to a certain stage of cooking is followed by blanching in oil within the following prescribed limitations, the result is a uniform end product exhibiting complete enzyme deactivation and also complete absence of any sloughing effect. In the instant process it is thus necessary that both water and oil blanching be utilized, and within those limitations as defined in the following.

Accordingly, it is a primary object of this invention to provide a reconstituted French fried product which exhibits the optimum in certain required characteristics, such as proper texture, proper color, lack of interior or exterior oil content to an excessive amount, crispness, etc.

It is a further objective of the invention to provide a process for the production of the reconstituted product here described which utilizes what might be termed a four stage system, at least insofar as water and oil blanching, and subsequent primary and secondary frying, be concerned.

Another object of the invention is to provide a process of the described nature wherein the entire treatment involves a series of six steps, two involving blanching prior to freezing, one comprising freezing, and three (the steps of reconstitution) involving preliminary frying, air cooling, and refrying. In other words, in this respect the method herein described is directed to the entire series of process steps commencing with an initial water blanch and ending with final preparation of the product for consumption by a second frying phase after an intermediate phase of air cooling.

It is another objective of the invention to provide the process of the described type, particularly designed for the treatment of French fried potatoes and the reconstitution thereof, wherein the product so treated is preferably one having a predetermined sugar content which falls within a definite range, and which exhibits a specific gravity and a solids content within definite and chosen limitations.

Other objectives and advantages of the invention will be apparent from the more detailed explanation and descriptions thereof which follow.

The specific steps of our novel method are diagrammatically illustrated in the flow sheet appended hereto. Here it is seen that a series of six process steps or phases are contemplated, as follows: A water blanch, an oil blanch, freezing of the product, and ultimately reconstitution. The process of reconstitution itself consists of three additional stages: a preliminary frying, intermediate air cooling and finally, refrying.

All of these phases or stages of treatment are carried out under controlled conditions as to time and temperature, it being necessary that such conditions be fulfilled within definite and state limits, as illustrated in the attached flow diagram, and as per the following description thereof.

It is contemplated that in carrying out the process of the invention the starting product, the raw potato preferably be, as to specific gravity, sugar and solids content, of a pre-determined type. It has been found, for example, that the raw potatoes which are treated should contain reducing sugars within a definite range, represented by a range of from 0.1% to 1.0%. Such represents a range which is somewhat narrower than that generally considered acceptable with respect to French fries frozen in the ordinary manner. Such narrower range can be explained by the fact that the water blanching step of the instant process is of a period of time somewhat less than that ordinarily considered to be normal. If the reducing sugars be higher than the stated range, e. g. in excess of 1.0%, it is considered that the involved sugars would be insufficiently leached out of the surface of the potato product. The result, it has been found, is an uneven, overly colored end product, consequent upon the browning of the sugars by carmelization. In this respect also, certain commercial buyers of processed French fried potatoes do not desire the addition of any sugar to the natural product, i. e. addition of sucrose or dextrose although in some instances this practice is deemed to be acceptable.

At any rate, in order to achieve the required end product it is also contemplated that the starting product, the raw potato, must have a solids content of an acceptable order. There is, of course, a definite ratio between total solids content and the specific gravity of the raw potato (see Table 67, "Potato Processing," Talburt and Smith).

For practice of the instant process it is preferred that the specific gravity of the raw potato fall in a range of between 1.075 to 1.095. A preferred specific gravity is about 1.085. This represents a solids content of about 21%. (The referred to text indicates that a solids content of 22.0% is represented by a specific gravity of 1.0861.)

In the practice of our novel method the raw potato, i.e., that type of raw product exhibiting the characteristics just described, is thoroughly washed in the customary manner, and peeled and trimmed in the usual manner.

After trimming, the raw potatoes are cut into strips which, ideally, should measure in cross section, before frying, not substantially less than ¼ inch by ¼ inch. Although a slightly larger cut may be made the minimum size cannot be substantially smaller than one-quarter inch in cross section if high production cutting is involved. As to the latter, the preferred system contemplated for cutting purposes is represented by the F. G. Lamb et al. Patents Nos. 3,109,468 and 3,116,772. These patents describe a uniquely arranged, hydraulicly motivated cutting apparatus which is particularly adapted to the segmenting of French fries having a dimension of one-quarter inch in cross section at an excessively high rate of speed, representing extremely high volume output.

In any event, after being thusly segmented, the cut strips are then washed with cold water one or more times as is the ordinary practice in the preparation of all frozen French fries. Such washing tends to remove a portion of the free starch on the surface of the strips consequent upon the rupture of some of the cells of the raw potato during the cutting operation.

In the process of this invention the initial step of real significance comprises an initial water blanch—such being necessary in order to obtain the proper texture of the finished product. Also, this initial water blanching aids in leaching out a portion of the reducing sugars in the raw product, if the range of same be relatively high. In addition, and as indicated above, the initial blanching substantially aids in reducing enzymatic action, an all-important facet of the operation and necessary in order that the ultimately frozen product exhibit an adequate storage life. Of course, if the involved enzymes are not thusly deactivated, deteriorative action will occur during storage. With regard to this water blanching step, such is confined to a period of time of between about 3½ minutes to about 6 minutes. Within this range, a period of 4½ minutes is preferred. The temperature of the water during blanching may range from between about 155° F. to about 165° F., and within this range, 160° F. is preferred.

The initial water blanch is followed by an oil blanch. This is conducted also within controlled time and temperature conditions. As to time, the oil blanch is relatively short, falling within the range of about 50 seconds to about 90 seconds. Preferred time of treatment is 65 seconds. As to oil temperature during the oil blanch, such must be maintained at a temperature of from about 270° F. to about 325° F. A preferred oil temperature, as demonstrated by the successful results of repeated practices of the involved method, is 280° F.

As stated above, these two steps of water, then oil, blanching are critical to the success of the entire operation. In repeated tests it was determined that if only the water blanch were used the desired product was not obtained. For example, an amount of potatoes were blanched in water at 160° F. for four minutes. Actual tests have demonstrated that the enzymes in the product were not completely inactivated. The potatoes were frozen and placed in a freezer. Further observation indicated that as those potatoes began to freeze, they dehydrated very rapidly. Upon reconstitution, it was also observed that such portion of the strips which were partially dehydrated, darkened readily and had imparted to them a burnt flavor.

In contrast, where three different charges of potatoes were separately water blanched at 160° F. for four minutes, and this followed by three oil blanches, respectively at 60 seconds, 75 seconds, and 90 seconds, no enzymatic activity whatsoever resulted. Also, there was a complete absence of any "sloughing effect." Thus, as has been stated, by water blanching to a certain stage of cook and finishing the blanching in oil, not only renders the end product uniform but completely eliminates any sloughing effect which may be observed in reconstituted products which have not been treated in the described manner.

In any event, after these two water-oil blanching phases the product is frozen, preferably by application of cold air at a low of −20° F. At a preferred time in the freezing tunnel of about 30 minutes, the actual pulp temperature of the potato product would be about, or somewhere above, 0° F. The product is then taken from the freezing tunnel and placed in a cold storage warehouse, which is maintained at a temperature of about −5° F., or lower. In due course the pulp temperature of the product reaches the warehouse temperature.

The product is prepared for consumption, from the frozen state, by additionally cooking the same by two separate frying steps with an intermediate air cooling stage therebetween.

In other words, there are three states involved in this final procedure:

Firstly, preliminary frying; in this step the product is fried in the chosen vegetable oil for a period of time of from four to five minutes, four and one-half minutes being preferred. The oil is maintained at a temperature of from about 300° to about 340° F., a temperature of 325° F. being preferred. A usual type of vegetable oil, as cottonseed oil, is used.

Secondly, following such preliminary frying the product is reduced in temperature by any suitable form of air cooling. Cooling is conducted for that period of time sufficient to bring the pulp temperature of the product down to at least 120° F. There may be times when it is desired to cool the product simply by subjection to room temperature over a period of time of several hours—this before final refrying takes place. Such is advantageous from the viewpoint of the cook—there is then a reserve supply of the product which has been completely prepared and ready for serving except for the final refrying.

Thirdly, the product is "re-fried," meaning that it is again subjected to the cooking oil for a period of time of from about one and one-half minutes to two minutes, with the oil at an ideal temperature of from about 320° to 325° F. It should here be understood that oil cannot be maintained at this narrow range of temperature for the following reasons. For example, the fryer thermostat can be set at 340° F., the oil reaching that temperature in due course. However, if one puts into such a hot oil vat a charge of potatoes to be fried, which product is at temperatures of up to 120° F., the oil temperature (340° F.) is lowered in temperature, not only due to the lower temperature of the product but to the cooling effect of additional moisture being boiled from the potatoes. The oil temperature may thus be reduced to as low as 300° F., a figure which must necessarily be based on the volume of potatoes added in relation to the volume of the oil. At any rate, there will be and necessarily so, a certain fluctuation in oil temperature. Despite this fact, an ideal temperature, within as close tolerance as possible for the frying process, would be between 320° and 325° F. For the purpose of this invention, however, and because of the noted fluctuation in oil temperature due to additions of the potato charge, an oil temperature range of from about 300° to 340° F. is here contemplated.

After the refrying step just described, the resultant product, now ready for consumption, does definitely display those desirable attributes which have been outlined in the foregoing. Repeated tests demonstrated this; and in an operation wherein over 100,000 pounds of potatoes were so treated, these desirable attributes were consistently found in the ultimate reconstituted product.

The reason why two separate frying stages, such stages being separated by an air cooling phase, should contribute to the extraordinary results which we have found, is not clearly understood. One theory, however, is that the unique method of frying may have some effect in retrograding the starch. One hypotheses may also be that inasmuch as the heat is predominately transferred only by induction by the oil through the surface of the potato to the center (and this at a time when the strip is constantly being cooled by the evaporation of proportionately large quantities of water which is boiled off) the center requires less cooking in relation to the exterior of the product. In any event the proven fact is that the water-oil blanching steps, when followed by a preliminary fry, air cooled and re-fried series of steps, does result in the production of a vastly improved end product. By improved is meant achievement of those qualities enumerated in the foregoing, primarily with respect to texture, crispness, mealiness, and proper appearance, i.e. not scorched or over browned, due to carmelization of the contained sugar, or for other reasons.

It is to be understood that the process steps comprising this invention may be varied somewhat within the preferred time and temperature limitations above stated. However, substantial deviation from these, i.e., times or temperatures outside of the stated ranges, will result in production of a French fried product of inferior quality and below those standards itemized above, and as representing the aim of the industry. In other words, by following the precise ranges enumerated in the foregoing, with respect to both time and temperature, and with respect to each of these procedural steps, the desired end product is obtained.

The following example is representative of a preferred practice of the process.

EXAMPLE 1,000 pounds of potatoes were initially prepared as indicated: washed, peeled, and trimmed in the customary manner.

They were then cut into strips or segmented into elongated segments one-fourth inch in diameter.

Such raw potatoes as were used exhibited a sugar content of .5% and had a specific gravity of 1.085, indicating a solids content of about 21%.

This charge of potatoes was initially water blanched for a period of 4½ minutes, the water being maintained at a temperature of 160° F.

An oil blanch followed, said oil blanch being conducted for a period of 70 seconds with the oil maintained at a temperature of 280° F.

The product was then frozen by submission to lower temperatures, here −20° F., and over a period of time of thirty minutes.

The product was then placed in frozen storage.

After removal from frozen storage these pre-treated frozen potatoes were reconstituted by the following three step procedure:

(a) Preliminary frying at a temperature of 325° F., and for a period of time of 4½ minutes.

(b) Air cooled for a time of 1½ minutes to several hours and with the cooling air supply being sufficient to reduce the temperature of the prduct to at least 120° F.

(c) The product was then re-fried by the process of deep fat frying for a time of 1½ minutes, the oil used being maintained, during this period of time, at a temperature of 325° F.

The scope of this invention is not to be limited in any manner except as confined by the metes and bounds of the claims appended hereto.

We claim:

1. A process of producing an improved frozen French fried potato product from raw potatoes comprising segmenting said potatoes into strips, water blanching said strips for about 3½ minutes to about six minutes at a temperature of from about 155° F. to about 165° F., oil blanching said strips for from about 50 seconds to about 90 seconds at a temperature at from about 270° F. to about 325° F., then freezing said strips, initially deep fat frying said strips for from about 4 minutes to about 5 minutes at a temperature of from about 300° F., to about 340° F., air cooling said strips for a time sufficient to reduce the temperature of said product to about 120° F., and deep fat re-frying said strips for from about 1½ to about 2 minutes at a temperature of from about 300° F. to about 325° F.

2. The invention as defined in claim 1 wherein said raw potatoes have a sugar content of from about .1% to about 1.0%, a specific gravity of from about 1.075 to 1.095% and a solids content of at least 21%.

3. The invention as defined in claim 1 wherein the temperature of the freezing medium is applied at about −20° F.

4. The invention as defined in claim 1 wherein said water blanching is for a period of 4½ minutes, said oil blanch is for a period of 70 seconds, said freezing is for a period of time sufficient to reduce the pulp temperature of said product to about 0° F., said initial deep fat frying is for a period of 4½ minutes, said air cooling is for a period of 2 minutes and said re-frying is for a period of 1½ minutes.

5. The invention as defined in claim 1 wherein said water blanch temperature is 160° F., said oil blanch temperature is 280° F., said initial deep fat frying temperature is 325° F., and said re-frying is at a temperature of 325° F.

6. The invention as defined in claim 1 wherein said water blanch is for 4½ minutes at a temperature of 160° F., said oil blanch is for 70 seconds at 280° F., said initial deep fat frying is for 4½ minutes at 325° F., and said re-frying is for 1½ minutes at 325° F.

References Cited

UNITED STATES PATENTS

| 2,286,644 | 6/1942 | Pringle et al. | 99—100 |
| 2,780,551 | 2/1957 | Guadagni | 99—193 |
| 2,855,308 | 10/1958 | Buechele et al. | 99—100 |
| 2,907,659 | 10/1959 | Anetsberger et al. | 99—100 |
| 2,983,619 | 5/1961 | Shaw et al. | 99—186 |
| 3,078,172 | 2/1963 | Libby | 99—192 |

OTHER REFERENCES

Gould, W. A., "Watch Color, Flavor and Texture When Freezing French Fried Potatoes," Food Packer, February 1954, vol. 35, pages 52–54.

A. LOUIS MONACELL, *Primary Examiner.*

D. M. NAFF, *Assistant Examiner.*